INVENTOR.
ARCHIE L. ALBERS
BY
Kimmel & Crowell
ATTORNEYS.

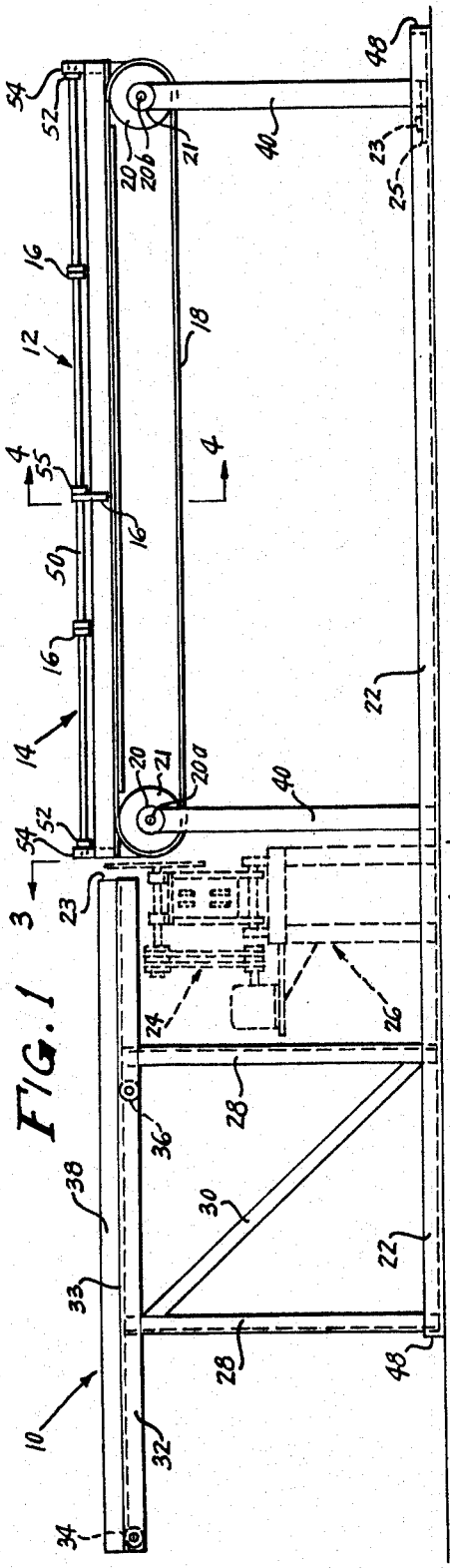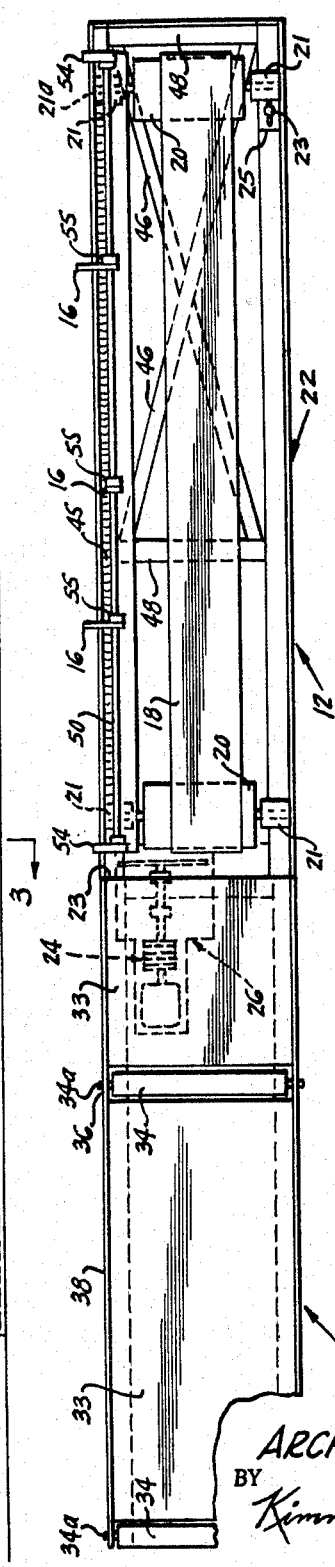

United States Patent Office 3,263,716
Patented August 2, 1966

3,263,716
LUMBER REST TABLE AND MEASURING CONVEYOR TABLE COMBINATION FOR A CUT-OFF SAW
Archie L. Albers, Yuba City, Calif.
(6456 Larry Way, North Highlands, Calif. 95660)
Filed Feb. 3, 1964, Ser. No. 342,141
1 Claim. (Cl. 143—132)

This invention relates to a new and improved lumber measuring and conveyor table combination for a cut-off saw, and more particularly to a combined rest table means and conveyor table means cooperating in spaced relationship about a cut-off saw supported beneath said table means which permits full viewing of all saw cuts of lumber.

In the past saw cut-off attachments usually were suspended at a level below the main portion of the cut-off saw, making operation thereof more hazardous to an operator's hands and prohibited a clear view of the parting saw cut of lumber lengths for each cross-cut operation of the saw.

The instant invention solves the above problems by providing a cut-off saw means below the combined saw table and further provides automatic lumber conveying means, saving much labor and providing more efficient operation thereof in accordance with proper safety standards with regard to an operator's hands, during placing, measuring and sawing lumber thereon into designated lengths and conveying the sawed lumber therefrom.

A primary object of this invention is to provide a safe conveying table and lumber measuring stop means in spaced cooperation with a cut-off saw.

A further object of the invention is to provide a new rest table and measuring conveyor table combination which is simple of construction, has a minimum number of parts and is easy to manufacture.

Another object of the invention is to provide a positive safety combination table means for measuring, cutting and handling sawed lengths of lumber by a cut-off saw.

Yet another object of the invention is to provide a new work material rest table and measuring conveyor table combination in spaced relationship above the main support portion of a cut-off saw means of various sizes.

A still further object of the present invention is to provide a positive measuring stop which retains a piece of lumber carried by a conveyor belt to be held stationary while being sawed, and after severance, to be removed by the conveyor belt without manual adjustment.

Another object of the invention is to provide a rest table and conveyor table combination for a disc-like cross-cut saw means wherein the saw and support means therefor may be quickly serviced or interchanged with other similar saw and support means as required by various thicknesses of lumber to be sawed.

Other objects and many attendant advantages of the instant invention will be readily appreciated as the same becomes better understood by reference to the following detailed description when considered in connection with the accompanying drawings, in which:

FIGURE 1 is a view in elevation of the conveyor table, measuring guide means, rest table means and stop means in combination with a cut-off saw mounted below the table combination, as shown in broken lines;

FIGURE 2 is a plan view of FIGURE 1;

Figure 3:
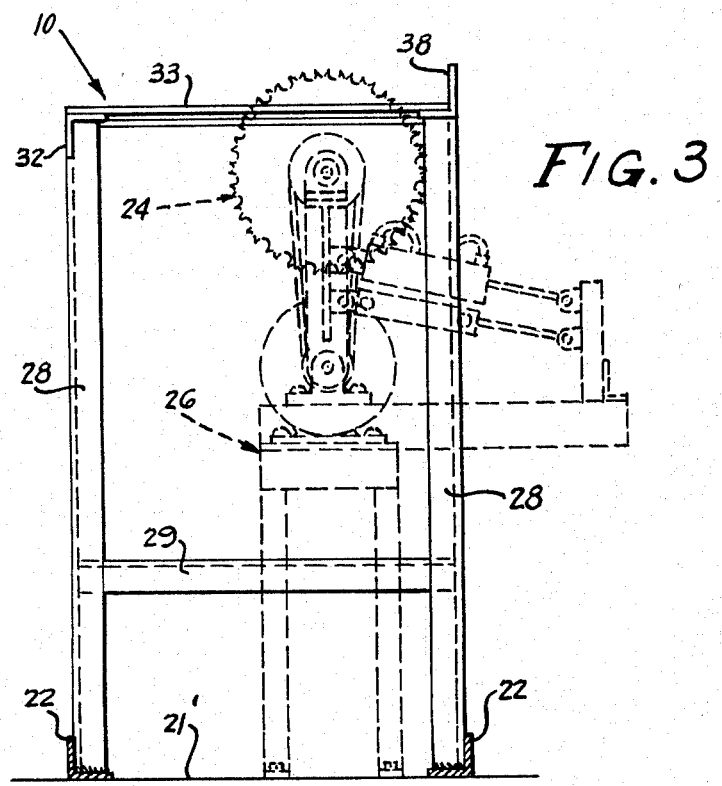
FIGURE 3 is a transverse cross-sectional view taken substantially on lines 3—3 of FIGURE 1 in the direction of the arrows.

Referring more specifically to the drawings, in which like reference numerals designate like parts throughout the drawings, FIGURES 1, 2, 3, and 4 show a preferred embodiment of the invention which, in general, is comprised of a work material rest table portion 10, a conveyor table portion 12, measuring guide means 14, stop means 16,. conveyor belt means 18, roller means 20, base or support frame 22 and cut-off saw means 24 with supporting stand 26.

Work or rest table means 10 is comprised of upright support members 28, lateral structural members 29, and diagonal structural members 30, all bolted, welded or suitably attached together and fixedly supported by a portion of base frame 22. Upright support structural members 28, front and back side angle members 32, back angle member 38, and two deck plate members 33 are welded or bolted together with roller means 34 mounted on shaft means 34a carried in bearing means 36 in angle members 32.

Any saw means may be used in conjunction with the table combination of the instant invention, my copending applications entitled "Lumber Measuring Conveyor Table and Radially Actuated Cut-Off Saw Combinaiton," Serial Number 342,140 and "Lumber Measuring Conveyor Table and Traveling Carriage Cut-Off Saw Combination," Serial Number 342,139, filed on an even date herewith being referred to as exemplary, the former being shown in dotted lines at 24 in the drawings of the instant application.

Figure 4:
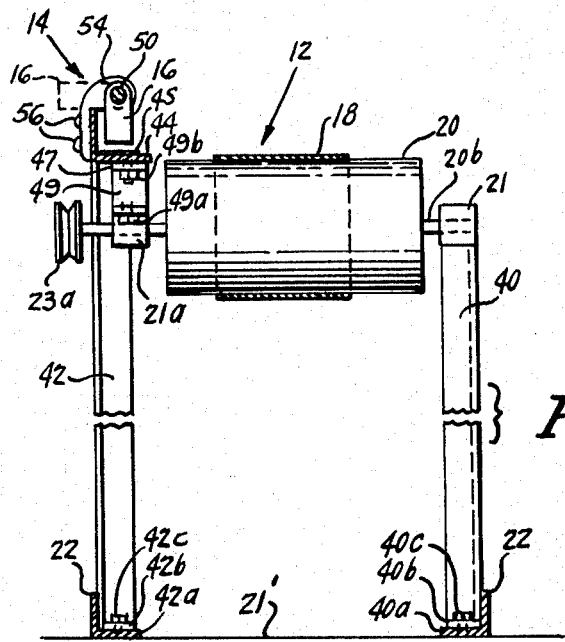
FIGURE 4 is a fragmentary sectional view of the conveyor belt table means and supporting roller and structural support means of FIGURE 1, taken on lines 4—4, in the direction of the arrows.

Conveyor table portion 12 is comprised of upstanding front and back structural support members 40 and 42, respectively, back angle means 44 rigidly joining together back support members 42 by being fixedly secured together by welding, bolts or other conventional means. Support frame means 22 below conveyor table portion 12 is laterally secured together by transverse members 46 and lateral members 48 welded together or fixedly secured together by bolts or other conventional means. Roller means 20 are supportably carried by shaft means 20a and 20b in bearing means 21 of structural members 40 and bearing means 21a secured by bolt means 49a to bracket support means 49 which is in turn adjustably secured by bolt means 49b and slot means 47 in bracket means 49 to back angle means 44. Structural support members 40 and 42 at the distal end of conveyor table means 12 terminate at their lower ends in foot means 40a and 42a, respectively, each having adjustable slot means 40b and 42b, respectively, therein, as best shown in FIGURE 4, and adjustably secured to frame means 22 by set screw means 40c and 42c, respectively. Roller means 20 carry conveyor belt means 18. Shaft means 20b terminates in an extended portion adapted to fixedly receive pulley means 23a secured thereto by set screw, key means or other conventional means, not shown. Pulley means 23a may be energized by a motor means, as understood by those skilled in the art.

Rest table means 10 and conveyor table means 12 are secured in spaced relationship on base frame means 22 with opening 23 therebetween to permit alignment and operation of saw means 24 therein.

Measuring guide means 14 is comprised of a rod 50 secured in bearings 52 in bearing support means 54 carried by angle means 44 and secured by rivets or bolts 56. Measuring rod 50 rotatably carries a plurality of stop members 16 thereon in a spaced relationship. Angle means 44 may have a conventional measuring scale indicia means 45 suitably inscribed thereon or attached by screw or other conventional means thereto, as desired.

Stop means 16 when not being used are rotated out of lumber abutting position, except the selected abutting stop means 16 used with lumber to be sawed, as indicated by broken lines in FIGURE 4. Stop means 16 is secured by set screw or detent means connected to slidable and rotatable bearing means 55 on rod means 50. One of the novel features of the instant invention resides in the dual function of stop 16 which serves both as a lumber measuring stop means for a length of lumber prior to being cut and also serves as a directing or guiding means after the lumber is sawed permitting a selected cut of lumber to drop free on conveyor belt 18. For example, a length of lumber is extended along angle 44 in over center position, sawed, and the sawed length determined by the stop falls onto conveyor belt 18 when cut off.

Belt 18 is adjusted by a tightening adjustment means comprising one pair of back and front support members 40 and 42 being adjustably attached to frame means 22 by slot means 40b and 42b by bolt means 40c and 42c, respectively, cooperating with slot means 47 in bracket means 49, secured by bolt means 49b to longitudinal angle means 44. Bracket means 49 supports bearing means 21a for axle or shaft means 20b of back roller means 20 by bolt means 49a, as best shown in FIGURE 4.

In the present embodiment of the invention additional transport roller and conveying means may be added to frame means 22, if desired, as understood by those skilled in the art.

Frame means 22 may be made as separate support frame portions for rest table portion 10 and conveyor table portion 12, if desired.

During operation of instant inventive combination lumber prior to being cut to selected lengths is deposited on rest table means 10 with its distal ends extending along index means 45 in over center position on angle 44 abutting a selected downwardly positioned stop means 16, for a particular length of lumber to be cut by saw means 24, after which the sawed length of lumber due to its over center position falls onto conveyor belt 18. For example, a selected sawed length of lumber falls off of index means 45 and angle means 44 onto conveyor belt means 18 and is conveyed off the distal end of conveyor table means 12. The continuous movement of the conveyor belt 18 causes the sawed lumber to be carried free of the stop means 16 to permit positioning of a further portion of the board for sawing.

From the foregoing it will now be seen that there is herein provided a new and improved lumber rest table means and measuring and conveyor table combination for a cut-off saw which accomplishes all the objects of this invention, and others, including many advantages of great practical utility and commercial importance.

It is to be understood, of course, that the foregoing disclosure relates to a preferred embodiment of the invention as illustrated, that various modifications and changes may be made in the invention by those skilled in the art without departing from the spirit and scope of the invention as set forth in the appended claim.

I claim:

A lumber measuring conveyor table and travelling saw cut-off combination comprising a carriage actuated cut-off saw means, a rest table, conveyor table means cooperating with said rest table, in spaced relation about said cut-off saw means, said conveyor table means including a conveyor belt and lumber measuring and abutting stop and guide means cooperating with designated sawed cut off lengths of lumber, said lumber measuring and guide means including a longitudinally extending angle iron member having a vertical leg and a horizontal leg extending parallel to and spaced above and transversely away from said conveyor belt, indicia on the upper surface of said horizontal leg of said angle iron member, a rod extending parallel to said angle iron above said horizontal leg and said indicia, a plurality of collars, slidably and swingably mounted on said rod, blades depending from said collars cooperating with said indicia and normally in the path of travel of lumber movable on said conveyor table to stop the lumber during sawing, and swingable about said rod to a position out of said path of travel to permit sawed lengths of lumber to drop from said horizontal leg onto said conveyor belt.

References Cited by the Examiner

UNITED STATES PATENTS

| 867,081 | 9/1907 | Robinson. | |
| 869,309 | 10/1907 | Kramer | 143—168 |
| 1,504,248 | 8/1924 | Johnson | 143—168 |
| 1,759,835 | 5/1930 | Boynton | 143—168 |
| 3,024,818 | 3/1962 | Scoville | 143—46 X |

FOREIGN PATENTS 240,541  8/1962  Australia.

WILLIAM W. DYER, JR., *Primary Examiner.*

W. D. BRAY, *Assistant Examiner.*